(12) United States Patent
Adachi et al.

(10) Patent No.: US 9,802,760 B2
(45) Date of Patent: Oct. 31, 2017

(54) AUTOMATED WAREHOUSE AND METHOD FOR CONTROLLING AUTOMATED WAREHOUSE

(71) Applicant: MURATA MACHINERY, LTD., Kyoto-shi, Kyoto (JP)

(72) Inventors: Naruto Adachi, Inuyama (JP); Nobuhiko Baba, Ise (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 15/506,289

(22) PCT Filed: Jun. 30, 2015

(86) PCT No.: PCT/JP2015/068790
§ 371 (c)(1),
(2) Date: Feb. 24, 2017

(87) PCT Pub. No.: WO2016/031383
PCT Pub. Date: Mar. 3, 2016

(65) Prior Publication Data
US 2017/0267454 A1    Sep. 21, 2017

(30) Foreign Application Priority Data
Aug. 25, 2014 (JP) .................. 2014-170257

(51) Int. Cl.
| B65G 1/12 | (2006.01) |
|---|---|
| B65G 1/137 | (2006.01) |
| B65G 1/10 | (2006.01) |
| B65G 1/06 | (2006.01) |
| A47F 3/04 | (2006.01) |

(52) U.S. Cl.
CPC ............. *B65G 1/137* (2013.01); *B65G 1/065* (2013.01); *B65G 1/10* (2013.01); *A47F 3/0478* (2013.01)

(58) Field of Classification Search
CPC .. B65G 1/06; B65G 1/12; B65G 1/137; A47F 3/0478
See application file for complete search history.

(56) References Cited

U.S. PATENT DOCUMENTS

| 4,546,901 A * | 10/1985 | Buttarazzi ............ B65G 1/1373 221/10 |
|---|---|---|
| 2008/0075567 A1* | 3/2008 | Di Rosa ............... B65G 63/065 414/266 |

FOREIGN PATENT DOCUMENTS

JP      5103714 B2    12/2012

* cited by examiner

*Primary Examiner* — Mark Beauchaine
(74) *Attorney, Agent, or Firm* — Keating & Bennett, LLP (57) ABSTRACT

In an automated warehouse, if a controller receives an instruction to retreat a first carrier and if the first carrier is holding an article or if an article is housed in a housing shelf corresponding to an isolation region that is a retreat destination, the controller causes the first carrier to carry the article to a housing shelf to and from which a second carrier is able to transfer an article, then causes the first carrier to retreat, and then drives the second carrier within a range of a track except for the isolation region. When it is detected that one of first doors corresponding to the isolation region has been opened, the controller continues driving the second carrier.

6 Claims, 8 Drawing Sheets

AUTOMATED WAREHOUSE AND METHOD FOR CONTROLLING AUTOMATED WAREHOUSE

BACKGROUND OF THE INVENTION

1. Field of the Invention

The present invention relates to an automated warehouse including multiple carriers and a method for controlling an automated warehouse.

2. Description of the Related Art

There are known automated warehouses in which an article is automatically transferred to or from a housing shelf (for example, see Japanese Patent No. 5103714). An automated warehouse of this type includes an outside panel including multiple openable/closable doors, housing shelves arranged vertically and horizontally inside the outside panel, and carriers that travel on a track installed on the floor along the housing shelves and that each include a transfer device which accesses one of the housing shelves to transfer an article. In this automated warehouse, the carriers and the like are operating in the internal space of the outside panel. For this reason, to ensure safety, the automated warehouse uses a technique of, when one of the openable/closable doors is opened, forcefully stopping the operation of the carriers, as an interlock.

According to Japanese Patent No. 5103714, if one of two carriers operating on the track is maintained, the other carrier operates in a region other than a region corresponding to the carrier to be maintained, thereby suppressing a reduction in the operating rate of the automated warehouse. However, this automated warehouse has a problem that if the carrier being maintained is holding an article and/or if an article is housed in a housing shelf corresponding to the carrier being maintained, the other carrier cannot access or transfer this article.

SUMMARY OF THE INVENTION

Preferred embodiments of the present invention provide an automated warehouse in which, if one of multiple carriers is isolated for maintenance or other purposes, an article held by the carrier to be maintained and/or an article housed in a housing shelf in an isolation region is carried to a housing shelf that is accessible to the remaining carrier and thus the remaining carrier is allowed to transfer the article, and a method for controlling an automated warehouse.

An automated warehouse according to a preferred embodiment of the present invention includes an outside panel that defines an internal space and includes multiple openable/closable doors that are able to open the internal space, multiple carriers that each carry an article to a housing shelf disposed in the internal space and travel on a single track, and a controller that controls the carriers. If the controller receives an instruction to retreat a particular carrier which is one of the carriers and if the particular carrier is holding an article or if an article is housed in a housing shelf corresponding to an isolation region defining and functioning as a retreat destination, the controller causes the particular carrier to carry the article to a housing shelf to and from which a remaining carrier except for the particular carrier, of the carriers is able to transfer an article and then causes the particular carrier to retreat. After retreating the particular carrier, the controller drives the remaining carrier within a range of the track except for the isolation region. When it is detected that an openable/closable door corresponding to the isolation region, of the openable/closable doors has been opened, the controller continues to drive the remaining carrier.

When it is detected that an unrelated openable/closable door not corresponding to the isolation region, of the openable/closable doors has been opened, the controller may stop driving the remaining carrier. The automated warehouse may further include a stopper detector that detects a stopper to regulate entry of the remaining carrier into the isolation region and a cage detector that detects a cage to surround a portion of the isolation region. When the stopper detector detects the stopper and/or when the cage detector detects the cage, the controller may start to drive the remaining carrier and to detect whether an unrelated openable/closable door has been opened. The isolation region may be a region including an edge of the internal space, and the controller may move the particular carrier toward the edge of the internal space on the basis of the retreat instruction.

According to another preferred embodiment of the present invention, a method for controlling an automated warehouse including an outside panel that defines an internal space and includes multiple openable/closable doors that are able to open the internal space and multiple carriers that each carry an article to a housing shelf disposed in the internal space and travel on a single track, includes, if an instruction to retreat a particular carrier which is one of the carriers is received and if the particular carrier is holding an article or if an article is housed in a housing shelf corresponding to an isolation region defining and functioning as a retreat destination, causing the particular carrier to carry the article to a housing shelf to and from which a remaining carrier except for the particular carrier, of the carriers is able to transfer an article and then causing the particular carrier to retreat, after retreating the particular carrier, driving the remaining carrier within a range of the track except for the isolation region, and when it is detected that an openable/closable door corresponding to the isolation region, of the openable/closable doors has been opened, continuing to drive the remaining carrier. The method may further include, when it is detected that an unrelated openable/closable door not corresponding to the isolation region, of the openable/closable doors has been opened, stopping driving the remaining carrier.

According to automated warehouses and methods for controlling an automated warehouse according to preferred embodiments of the present invention, when the operator performs maintenance or the like of one of the multiple carriers that travel on the same track, an article held by the carrier to be maintained and/or an article housed in a housing shelf corresponding to the isolation region of the carrier to be maintained is carried to a housing shelf to and from which the remaining carrier is able to transfer an article. Thus, it is possible to avoid the occurrence of an article that cannot be transferred while the carrier to be maintained is isolated. Even if an openable/closable door corresponding to the isolation region is opened, the remaining carrier is able to continue the carry operation. Thus, the operating rate of the automated warehouse is improved.

When it is detected that an unrelated openable/closable door not corresponding to the isolation region has been opened, the controller may stop driving the remaining carrier. That is, an interlock is able to be applied to the regions except for the isolation region. Also, when the stopper detector detects the stopper and/or when the cage detector detects the cage, the controller may start to drive the remaining carrier and to detect whether an unrelated openable/closable door has been opened. In this case, the controller confirms that the stopper and/or cage has been installed and then performs the drive and the like of the remaining carrier. The stopper is able to prevent the remaining carrier from erroneously entering the isolation region, and the cage is able to protect the operator from a falling object or the like. Also, the isolation region may be a region including an edge of the internal space, and the controller may move the particular carrier toward the edge of the internal space on the basis of the retreat instruction. Thus, a wide operating range for the remaining carrier is able to be ensured. Also, by installing the cage, the operator is isolated from the operating crane (carrier). Thus, it is possible to visibly recognize the carrier operating region and the maintenance region (the isolation region). Also, the cage is able to prevent the operator present in the maintenance region from unintentionally entering the carrier operating region.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings. However, the present invention is not limited thereto. To clarify the preferred embodiments, the drawings are scaled, for example, partially enlarged or highlighted, as necessary. In the drawings, directions are shown by an XYZ coordinate system. In this XYZ coordinate system, a plane parallel with the horizontal plane is referred to as an XY-plane; the right direction of the drawing in the XY-plane as an X-direction; the upward direction of the drawing as a Y-direction; and the direction perpendicular to the XY-plane as a Z-direction. In the drawings, directions shown by arrows are the positive directions of the X, Y, and Z directions, and opposite directions are the negative directions thereof.

Figure 1:
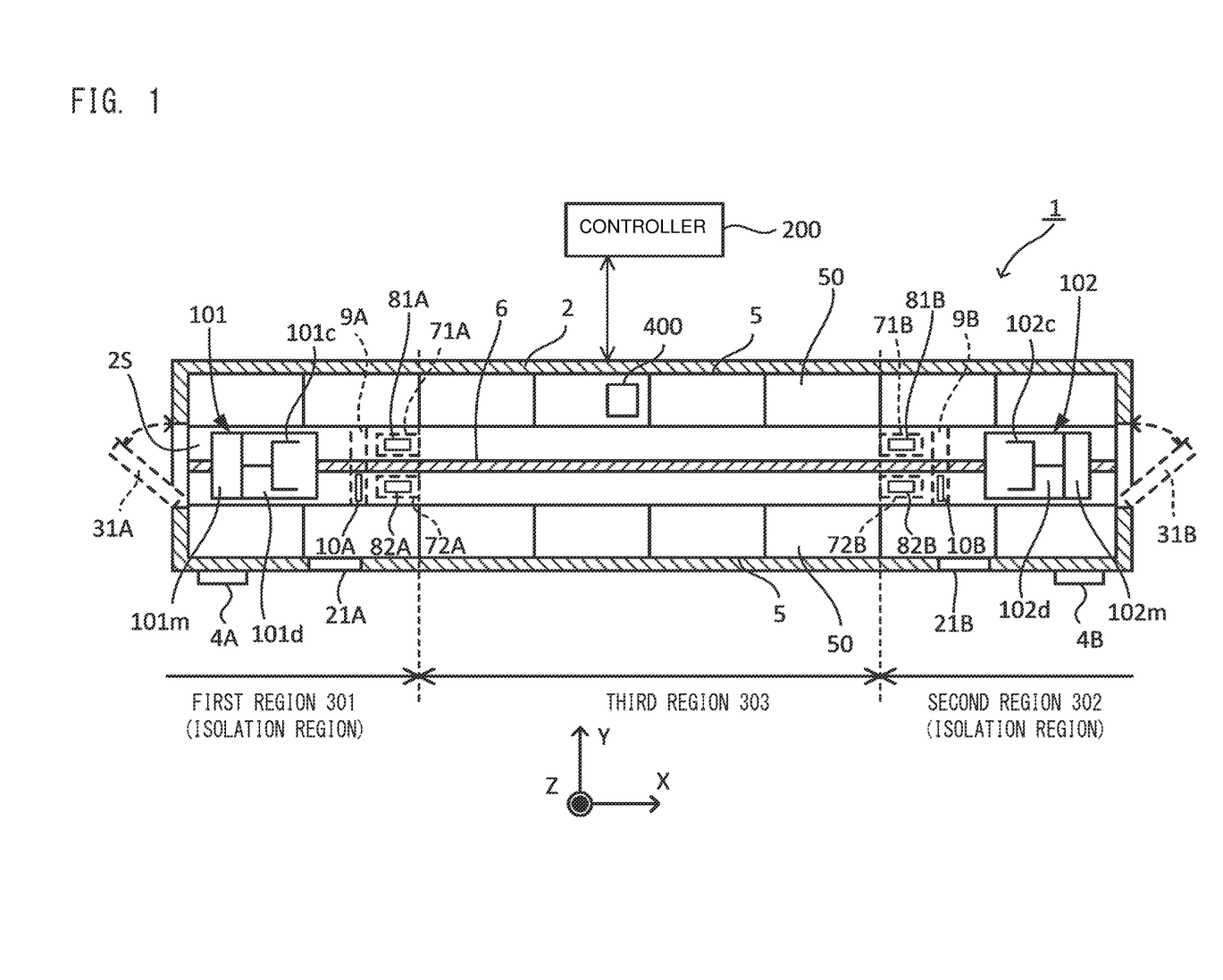
FIG. 1 is a plan view showing an example of an automated warehouse of a preferred embodiment of the present invention.
Figure 2:
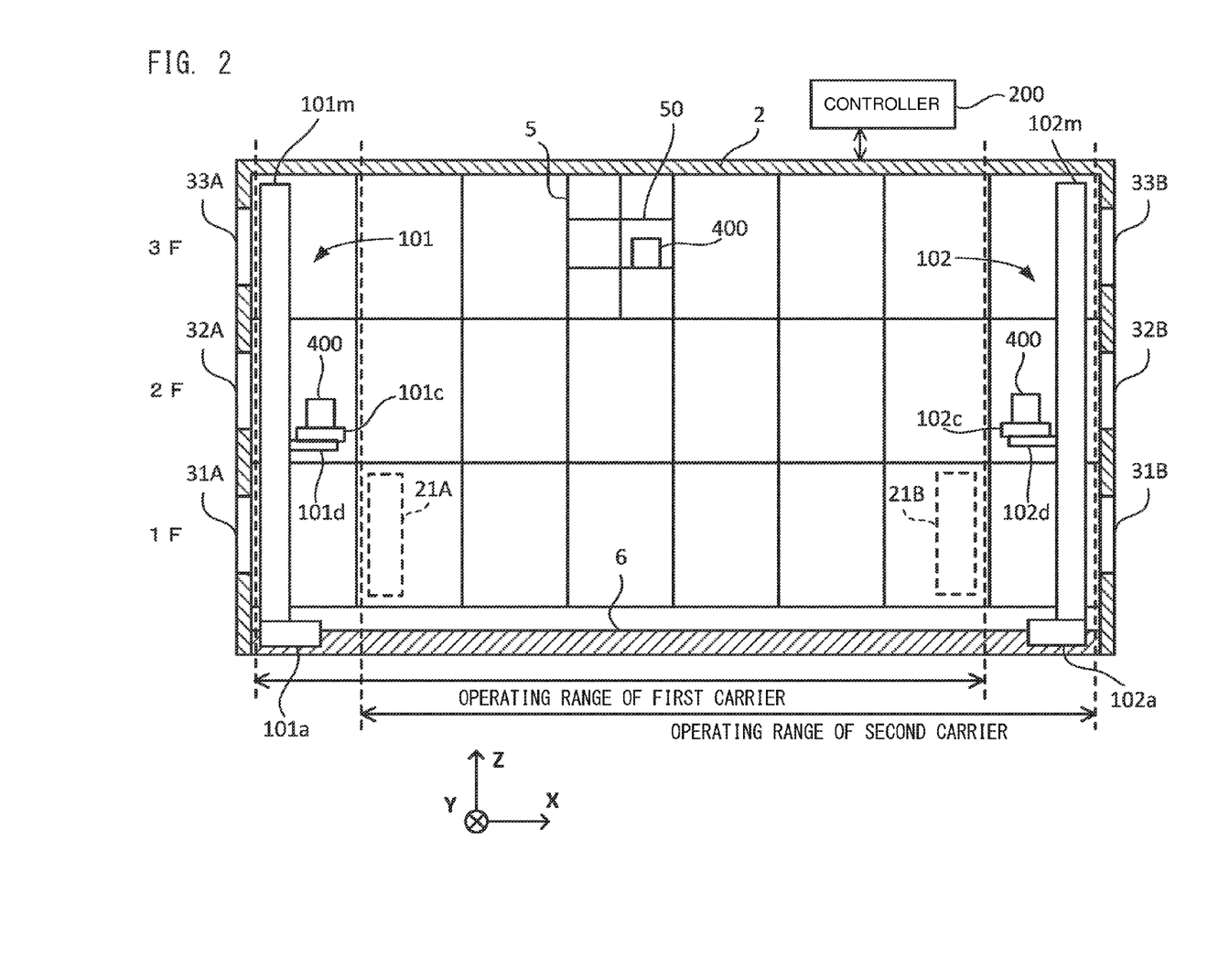
FIG. 2 is a side view of the automated warehouse shown in FIG. 1.

FIG. 1 is a plan view of an automated warehouse 1 of the present preferred embodiment. FIG. 2 is a side view of the automated warehouse 1 shown in FIG. 1. More specifically, FIG. 2 is a diagram of the automated warehouse 1 obtained by cutting the automated warehouse 1 shown in FIG. 1 along an XZ-plane and seen from the positive Y-direction. The automated warehouse 1 shown in FIG. 1 is a facility (an apparatus) in which an article 400 is automatically transferred to or from a housing shelf 50 of a rack 5. The automated warehouse 1 includes an outside panel 2 defining an internal space 2S.

As shown in FIG. 2, three doors, first doors 31A to 33A, are vertically disposed on the negative X-side surface of the outside panel 2, and three doors, second doors 31B to 33B, are vertically disposed on the positive X-side surface of the outside panel 2. These openable/closable doors are able to open the internal space 2S. The operator is able to enter spaces in a lower stage (a first level), a middle stage (a second level), and an upper stage (a third level) through the first openable/closable doors 31A to 33A and 31B to 33B. Although not shown in FIGS. 1 and 2, the openable/closable doors 31A to 33A and 31B to 33B are provided with monitors that are sensors that monitor the open states of the openable/closable door 31A and the like or sensors that monitor the unlocking of the openable/closable door 31A and the like (see first monitors 35A to 37A and second monitors 35B to 37B in FIG. 3).

As shown in FIGS. 1 and 2, the negative Y-side surface of the outside panel 2 is provided with drawing shelves (openable/closable doors) 21A, 21B that are able to open the internal space 2S on the negative and positive X-sides in the lower stage. Although not shown in FIGS. 1 and 2, the drawing shelves 21A, 21B are provided with drawing shelf monitors that are sensors that monitor the open states of the drawing shelf 21A and the like or sensors that monitor the unlocking of the drawing shelf 21A and the like (see first drawing shelf monitor 20A, second drawing shelf monitor 20B in FIG. 3).

As shown in FIG. 1, the negative X-side edge of the negative Y-side surface of the outside panel 2 is provided with a first operation interface 4A operable by the operator. By operating the first operation interface 4A, the operator performs various types of setting, control, and the like of the automated warehouse 1 and also performs the open control (e.g., unlocking) of the first openable/closable doors 31A to 33A or drawing shelf 21A. Also, as shown in FIG. 1, the positive X-side edge of the negative Y-side surface of the outside panel 2 is provided with a second operation interface 4B operable by the operator. By operating the second operation interface 4B, the operator performs various types of setting, control, and the like of the automated warehouse 1 and also performs the open control (e.g., unlocking) of the second openable/closable doors 31B to 33B or drawing shelf 21B. The first operation interface 4A and second operation interface 4B each transmit a signal corresponding to an operation of the operator to a controller 200.

Multiple racks 5 are vertically stacked preferably in the three stages (the lower, middle, and upper stages) in the internal space 2S of the outside panel 2. Each rack 5 includes multiple housing shelves 50. Thus, the housing shelves 50 are arranged vertically and horizontally (in the Z- and X-directions). While FIG. 1 does not show details of the housing shelves 50, FIG. 2 shows an example in which a housing shelf 50 is disposed in one rack 5. Note that the number of racks 5 and the number of housing shelves 50 in each rack 5 may be any numbers.

A rail (track) 6 on which first and second carriers 101, 102 travel is installed in the X-direction on the floor along the racks 5. First stoppers 71A, 72A and second stoppers 71B, 72B to regulate the entry of the carriers 101, 102 can be installed on both sides of the rail 6. The first stopper 71A and the like each have any shape that when contacting a portion of the carrier 101 or 102, and are able to regulate the entry of the carrier 101 or 102. The first stopper 71A and the like may be projected from or buried into the floor by the driving force of electric or hydraulic motors. First stopper detectors 81A, 82A and second stopper detectors 81B, 82B to detect the first stoppers 71A, 72A and second stoppers 71B, 72B, respectively, may be disposed in the internal space 2S. The first stopper detector 81A and the like may include contact or non-contact sensors. The first stopper detector 81A and the like may also detect the stoppers using images acquired by cameras or the like.

A first cage 9A and a second cage 9B to receive a falling object or the like can be disposed over the rail 6. The first cage 9A and the like have shapes that are able to protect the working space of the operator. For example, the first cage 9A and the like may be cages that are previously housed in portions of racks 5 and set by an electric motor or by hydraulic pressure. A first cage detector 10A and a second cage detector 10B to detect the first cage 9A and second cage 9B, respectively, may be disposed in the internal space 2S. The first cage detector 10A and the like may be contact or non-contact sensors. The first cage detector 10A and the like may detect the cages using images acquired using cameras or the like.

One or both of the first stopper detector 81A and the like or one or both of the first cage detector 10A and the like may be omitted. If the stoppers and cages are detected using cameras or the like, for example, the same camera may define and function as both the first stopper detector 81A and first cage detector 10A.

The first and second carriers 101, 102 are, for example, stacker cranes. The first and second carriers 101, 102 include traveling vehicles 101a, 102a that travel on the rail 6, masts 101m, 102m that stand on the traveling vehicles 101a, 102a, platforms 101d, 102d that are raised and lowered while being guided by the masts 101m, 102m, and transfer devices 101c, 102c mounted on the platforms 101d, 102d. The first and second carriers 101, 102 position the platforms 101d, 102d with respect to any housing shelves 50 and then transfer articles 400 by driving the transfer devices 101c, 102c.

Both the first and second carriers 101, 102 are able to transfer articles 400 to and from the positive and negative Y-side housing shelves 50. The first and second carriers 101, 102 receive power required to perform the above operation, for example, from a power supply using a cable installed on the floor or the like along the rail 6 (see a power supply 250 in FIG. 3). The power supply may be a contact power supply or non-contact power supply.

The first and second carriers 101, 102 operate within first to third regions 301 to 303 shown in FIG. 1. The first region 301 is a region from the negative X-side end of the rail 6 to a position in which the first stoppers 71A, 72A can be disposed. The second region 302 is a region from the positive X-side end of the rail 6 to a position in which the second stoppers 71B, 72B can be disposed. The third region 303 is a region between the first region 301 and the second region 302. The first and second carriers 101, 102 operate within a range in which the carriers do not interfere with each other. The maximum operating ranges of the first and second carriers 101, 102 are, for example, ranges shown in FIG. 2. Specifically, when one of the first and second carriers 101, 102 is non-operating, the other carrier is able to access almost all ranges except for some surrounding shelves in which the arm of the non-operating carrier (the transfer device 101c, etc.) is retreated.

The first region 301 and second region 302 are regions in which the maintenance (e.g., inspection, repair) or the like of the first and second carriers 101, 102 is performed and define and function as isolation regions (to be discussed later).

When the first carrier 101 is isolated in the first region 301, the first region 301 serves as an isolation region; when the second carrier 102 is isolated in the second region 302, the second region 302 defines and functions as an isolation region.

When the first region 301 is used as an isolation region, the first stoppers 71A, 72A and first cage 9A are installed on or over the rail 6; when the second region 302 is used as an isolation region, the second stoppers 71B, 72B and second cage 9B are installed on or over the rail 6. The installation of these elements is detected by the first stopper detector 81A and the like and first cage detector 10A and the like, and a signal indicating the detection is transmitted to the controller 200 (to be discussed later).

The controller 200 controls the automated warehouse 1. The controller 200 may be disposed on the outside panel 2 of the automated warehouse 1, or may be disposed away from the automated warehouse 1 so as to be connected thereto by wire or wirelessly. The controller 200 may centrally control multiple automated warehouses 1 rather than controlling a single automated warehouse 1. Some functions of the controller 200 may be performed by a higher-level controller connected to the controller by wire or wirelessly.

Figure 3:
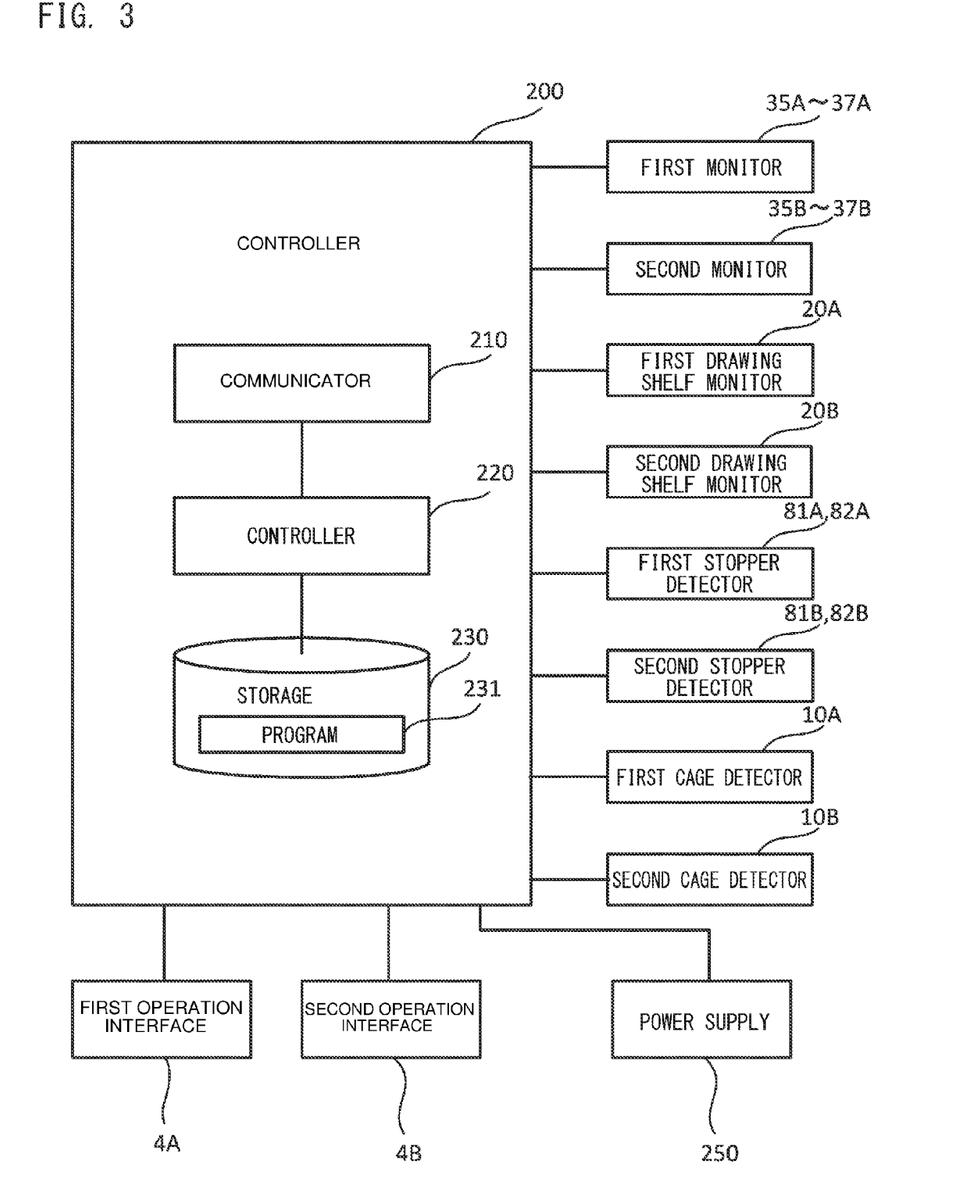
FIG. 3 is a block diagram showing the configuration of the control system of the automated warehouse.

FIG. 3 is a block diagram showing the configuration of the control system of the automated warehouse 1 including the controller 200. As shown in FIG. 3, the controller 200 is connected to the first operation interface 4A, the second operation interface 4B, the first monitors 35A to 37A, the second monitors 35B to 37B, the first drawing shelf monitor 20A, the second drawing shelf monitor 20B, the first stopper detectors 81A, 82A, the second stopper detectors 81B, 82B, the first cage detector 10A, the second cage detector 10B, and the non-contact power supply 250. The controller 200 may be connected to the elements, such as the first operation interface 4A, by wire or wirelessly. The controller 200 includes a communicator 210, a controller 220, and a storage 230 (i.e., memory). The communicator 210 performs data communication with the first operation interface 4A and the like. Although not shown in FIG. 3, the communicator 210 also performs data communication with the first and second carriers 101, 102 by wire or wirelessly.

The controller 220 controls the automated warehouse 1, for example, by setting the mode (an operating mode, a non-operating mode, an isolation mode) of the carriers 101, 102, controlling the carry operation of the carriers 101, 102, controlling the interlock, and changing the power supply area of the non-contact power supply 250. The controller 220 performs the above control on the basis of a program 231 stored in the storage 230. The storage 230 stores various types of data, including the program 231.

The first monitors 35A to 37A transmit detection signals indicating the open states of the first openable/closable doors 31A to 33A to the controller 200. The second monitors 35B to 37B transmit detection signals indicating the open states of the second openable/closable doors 31B to 33B to the controller 200. The first drawing shelf monitor 20A transmits a detection signal indicating the open state of the drawing shelf 21A to the controller 200. The second drawing shelf monitor 20B transmits a detection signal indicating the open state of the drawing shelf 21B to the controller 200.

Figure 4:
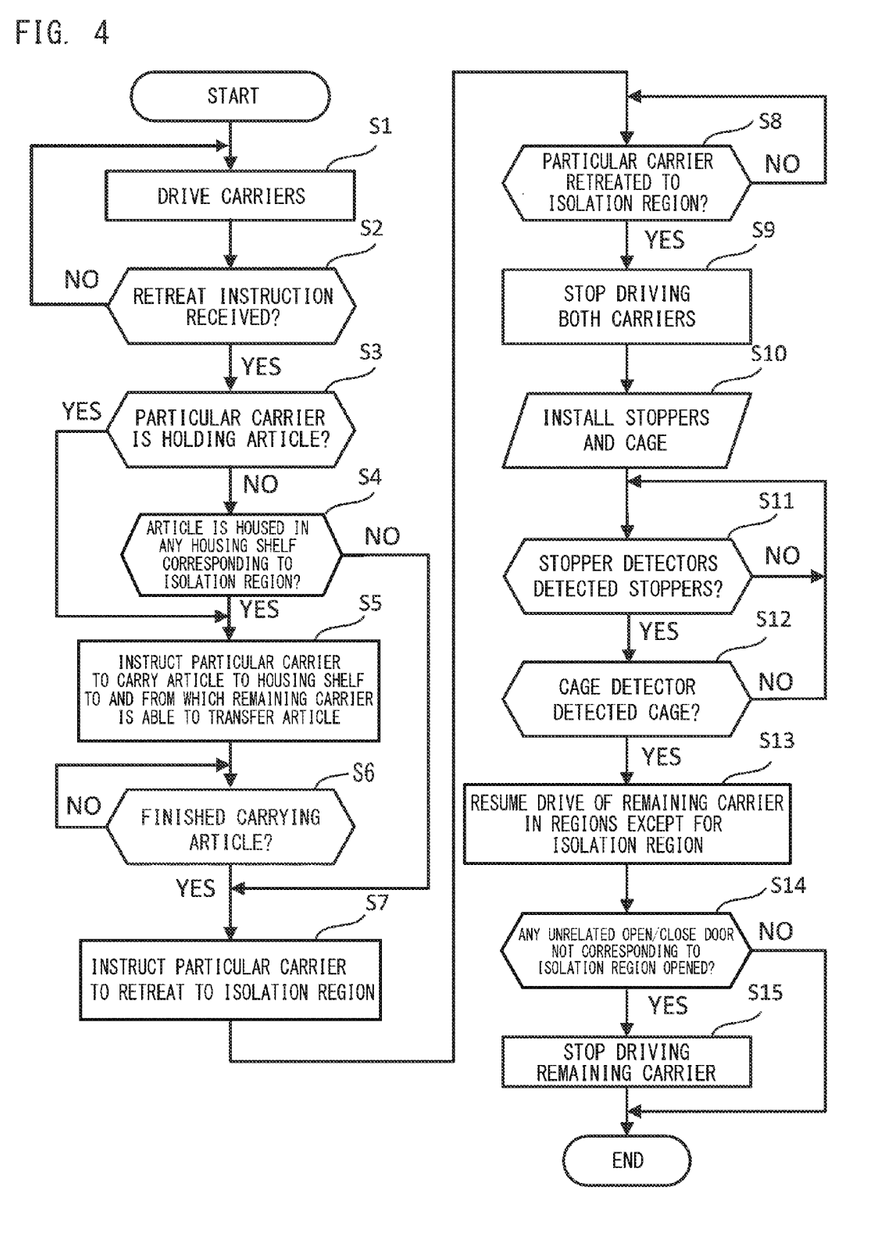
FIG. 4 is a flowchart showing the operation of the automated warehouse.

FIG. 4 is a flowchart showing the operation of the automated warehouse 1. However, the operation shown in FIG. 4 is only illustrative, and the operation of the automated warehouse 1 is not limited thereto. In FIG. 4, the controller 220 (the controller 200) sets the mode of the carriers to the operating mode and then controls the drive of the first and second carriers 101, 102 to cause the first and second carriers 101, 102 to perform carry operations (travel, descend/ascend, transfer, or the like) (step S1). If any of the first monitors 35A to 37A, second monitors 35B to 37B, first drawing shelf monitor 20A, and second drawing shelf monitor 20B detects the open state of the corresponding door or shelf, the controller 220 stops driving both the carriers 101, 102. Specifically, the controller 220 stops driving both the carriers 101, 102 by causing the non-contact power supply 250 to stop supplying power to all power supply areas.

To perform the maintenance or the like of one of the first and second carriers 101, 102, for example, the operator operates the operation interface (e.g., the first operation interface 4A) to cause the operation interface to transmit a retreat instruction signal to the controller 220. The retreat instruction signal here refers to a signal instructing the carrier (in this case, the first carrier 101) to retreat to the isolation region and contains information indicating the carrier to be retreated. Hereafter, of the first and second (multiple) carriers, the carrier instructed to retreat to the isolation region will be referred to as the particular carrier (s), and the carrier except for the particular carrier as the remaining carrier(s).

The controller 220 determines whether a retreat instruction signal has been received from the operation interface (step S2). If no retreat instruction signal has been received (NO in step S2), the controller 220 continues the normal carry operation. If it determines that a retreat instruction signal has been received (YES in step S2), the controller 220 changes the mode of the carriers to the non-operating mode. It also determines whether the particular carrier (the first carrier 101) is holding an article 400 (e.g., whether the particular carrier is traveling while carrying an article 400, or whether the particular carrier is transferring an article 400, or the like) (step S3). The controller 220 is transmitting and receiving various types of data (e.g., data indicating the current positions, operation situations, and the like of the carriers) to and from the carriers through the communicator 210 and determines whether the particular carrier is holding an article 400, on the basis of the data.

If the controller 220 determines that the particular carrier (the first carrier 101) is holding an article (YES in step S3), the process proceeds to step S5. On the other hand, if it determines that the particular carrier (the first carrier 101) is not holding an article (NO in step S3), the controller 220 determines whether an article 400 is housed in any housing shelf 50 in the isolation region (the first region 301) (step S4). The storage 230 stores data about the housing locations of articles 400. The controller 220 is managing the data about the housing locations of the articles 400 in the storage 230 by updating the data.

If the controller 220 determines that an article 400 is housed in a housing shelf 50 of the isolation region (the first region 301) (YES in step S4), the process proceeds to step S5. If the controller 220 determines that an article 400 is not housed in any housing shelf 50 of the isolation region (the first region 301) (NO in step S4), the process proceeds to step S7.

In step S5, the controller 220 instructs the particular carrier (the first carrier 101) to carry the article 400 to a housing shelf 50 to and from which the remaining carrier (the second carrier 102) is able to transfer an article. The particular carrier (the first carrier 101) carries the article 400 housed in the housing shelf 50 indicated by the controller 200 to the housing shelf 50 defining and functioning as the carry destination indicated by the controller 200.

Figure 5:
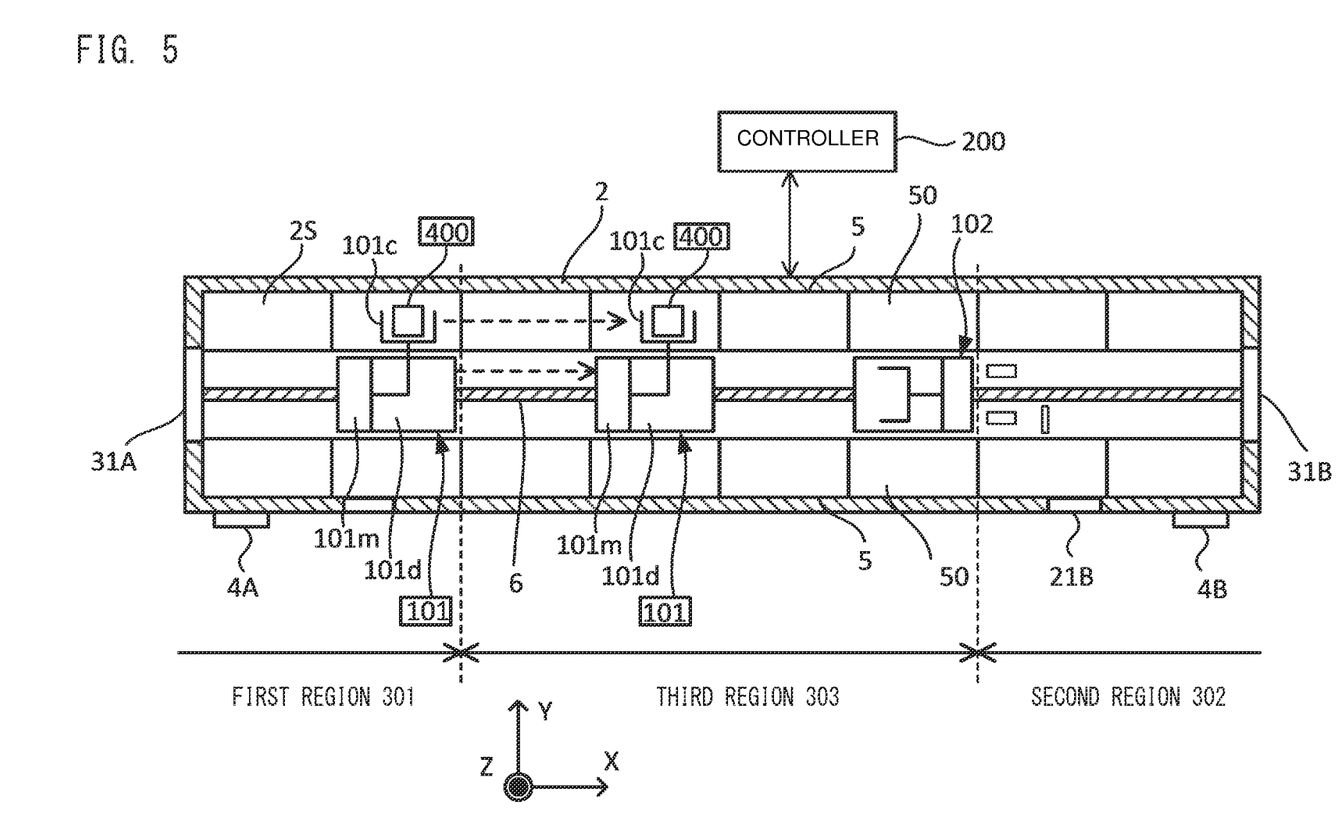
FIG. 5 is a plan view showing a non-operating mode.
Figure 6:
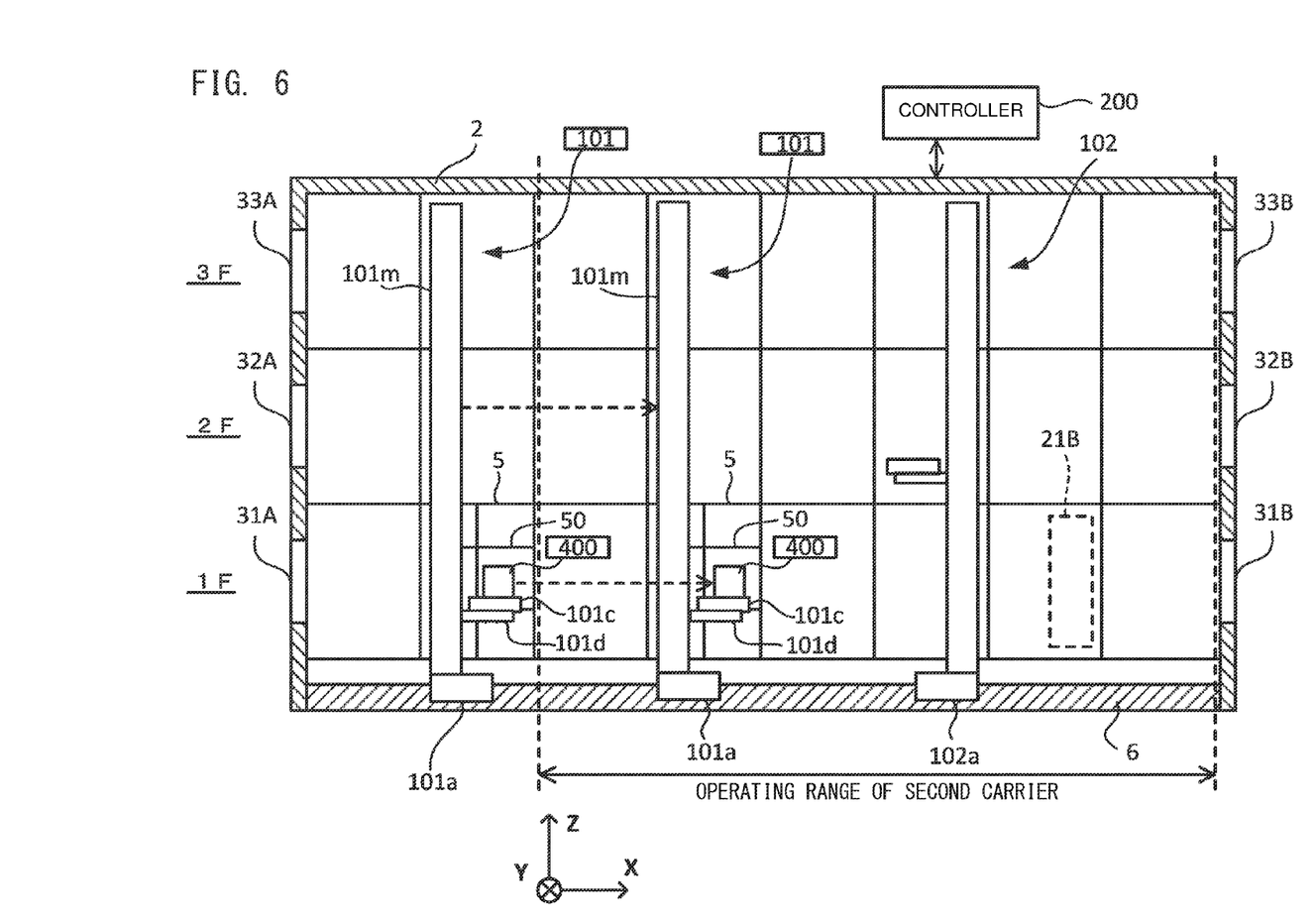
FIG. 6 is a side view showing the non-operating mode.

Steps S4 and S5 will be described below. FIG. 5 is a plan view of the automated warehouse 1 showing the carry of an article 400 in the non-operating mode. FIG. 6 is a side view of the automated warehouse 1 showing the carry of an article 400 in the non-operating mode.

As shown in FIGS. 5 and 6, an article 400 is housed in a housing shelf 50 in the isolation region. When the first operation interface 4A transmits an instruction to retreat the first carrier 101, to the controller 220, the first region 301 becomes an isolation region, and the article 400 housed in the housing shelf 50 in the first region 301 is carried. Accordingly, if the controller 220 determines in step S4 that an article 400 is housed in a housing shelf 50 in the isolation region (YES in step S4), it instructs the particular carrier (the first carrier 101) to carry the article 400 to a housing shelf 50 (within the operating range of the second carrier 102) to and from which the remaining carrier (the second carrier 102) is able to transfer an article (step S5).

The controller 220 identifies an empty housing shelf 50 among housing shelves 50 within the operating range of the second carrier 102, determines the identified housing shelf 50 as the carry destination, and instructs the first carrier 101 to carry the article 400 to this housing shelf 50. While any housing shelf 50 can be set as the carry destination as long as it is an empty housing shelf within the operating range of the second carrier 102, a housing shelf 50 easily accessible to the second carrier 102, such as a housing shelf 50 in the lower stage, may be selected and determined as the carry destination.

Referring back to FIG. 4, the controller 220 determines whether the particular carrier (the first carrier 101) has finished carrying the article 400 (step S6). If it determines that the particular carrier (the first carrier 101) has finished carrying the article 400 (YES in step S6), the controller 220 instructs the particular carrier (the first carrier 101) to retreat to the isolation region (the first region 301) (step S7). The particular carrier moves to the isolation region (the first region 301) in accordance with the instruction from the controller 220. If it determines that the particular carrier has not finished carrying the article 400 (NO in step S6), the controller 220 repeats step S6. Note that one of steps S3 and S4 or one of steps S5 and S6 may be omitted.

The controller 220 then determines whether the particular carrier (the first carrier 101) has retreated to the isolation region (the first region 301) (step S8). If it determines that the particular carrier has retreated to the isolation region (YES in step S8), the controller 220 temporarily stops driving both the carriers 101, 102 (step S9). Thus, even if the operator enters the internal space 2S of the outside panel 2, the safety of the operator is ensured. If it determines that the particular carrier has not retreated (NO in step S8), the controller 220 repeats step S8.

The operator enters the internal space 2S from one of the first openable/closable doors 31A to 33A or the first drawing shelf 21A in the isolation region (in the first region 301), installs the first stoppers 71A, 72A on the rail 6, and further installs the first cage 9A in such a manner that the first cage 9A covers a portion of the isolation region (step S10). The controller 220 determines whether the first stopper detectors 81A, 82A have detected the first stoppers 71A, 72A (step S11). If it determines that the first stopper detectors 81A, 82A have detected the first stoppers 71A, 72A (YES in step S11), the controller 220 determines whether the first cage detector 10A has detected the first cage 9A (step S12).

If it determines that the first cage detector 10A has detected the first cage 9A (YES in step S12), the controller 220 changes the mode of the carriers to the isolation mode.

It also restarts to drive the remaining carrier (the second carrier 102) in the regions (the second region 302, third region 303) except for the isolation region (step S13). Specifically, the controller 220 restarts to operate the remaining carrier by causing the non-contact power supply 250 to start to supply power to the regions except for the isolation region as power supply areas. If the first stopper detectors 81A, 82A have not detected the first stoppers 71A, 72A (NO in step S11) or if the first cage detector 10A has not detected the first cage 9A (NO in step S12), the controller 220 repeats step S11 or S12. Note that one or both of steps S11 and S12 may be omitted. In this case, the process proceeds from step S10 to step S13.

Figure 7:
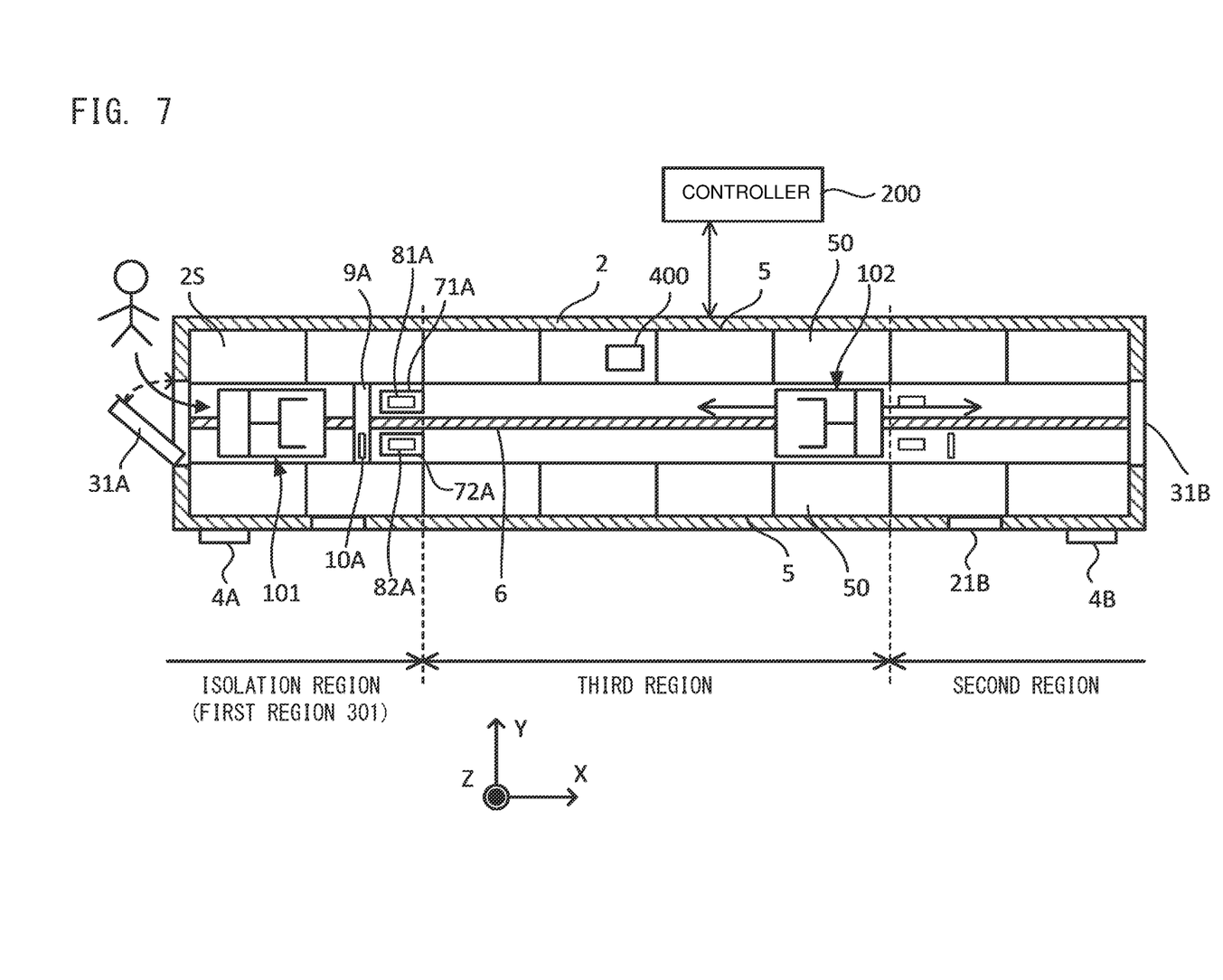
FIG. 7 is a plan view showing the transition to an isolation mode.
Figure 8:
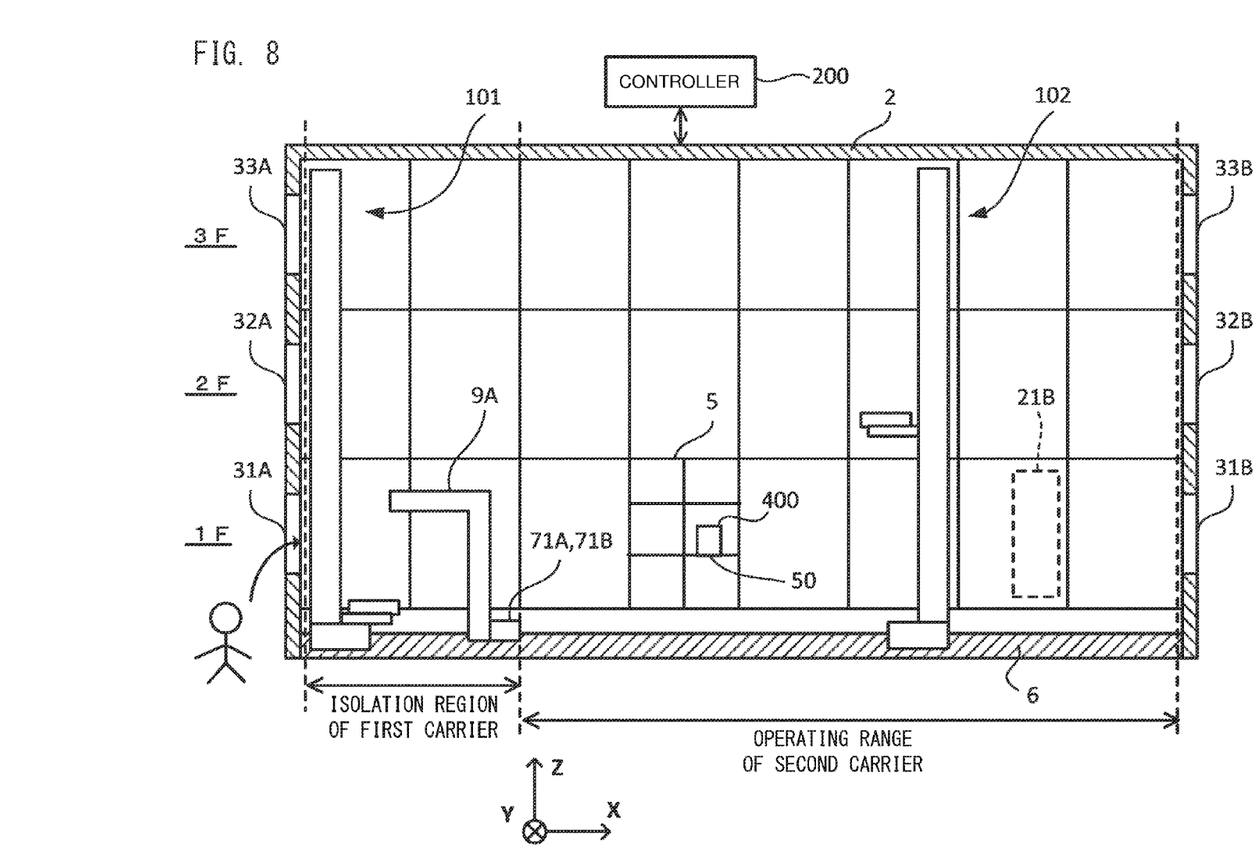
FIG. 8 is a side view showing the transition to the isolation mode.

The isolation mode will be described below. FIG. 7 is a plan view of the automated warehouse 1 showing the isolation mode. FIG. 8 is a side view of the automated warehouse 1 showing the isolation mode. As shown in FIGS. 7 and 8, with the first stoppers 71A, 72A and first cage 9A installed in the isolation region, the remaining carrier (the second carrier 102) restarts to carry an article 400 using the second region 302 and third region 303 except for the isolation region as the operating range.

Thus, even if the operator is performing the maintenance or the like of the particular carrier in the isolation region, the remaining carrier (the second carrier 102) is able to carry an article 400 on the basis of an operation instruction from the controller 220. As a result, a reduction in the operating rate is able to be suppressed. Also, the first stoppers 71A, 72A prevent the remaining carrier (the second carrier 102) from erroneously entering the isolation region. Also, the first cage 9A protects the operator from a falling object or the like. Note that in the isolation mode, the first openable/closable doors 31A to 33A and drawing shelf 21A corresponding to the isolation region (the related openable/closable doors) are not monitored and are not interlocked even when opened.

Referring back to FIG. 4, the controller 220 determines whether any of the second openable/closable doors 31B to 33B and second drawing shelf 21B (the unrelated openable/closable doors) not corresponding to the isolation region has been opened while the remaining carrier (the second carrier 102) operates (step S14). The controller 220 makes this determination on the basis of a detection signal from one of the second monitors 35B to 37B or second drawing shelf monitor 20B.

If it determines that one of the unrelated openable/closable doors has been opened (YES in step S14), the controller 220 stops driving the remaining carrier (the second carrier 102) (step S15). Specifically, the controller 220 stops driving the remaining carrier by causing the non-contact power supply 250 to stop supplying power to power supply areas corresponding to the regions except for the isolation region. Thus, the safety of the operator is ensured. If it determines that any of the unrelated openable/closable doors has not been opened (NO in step S14), the controller 220 continues to operate the remaining carrier (the second carrier 102).

When the operator completes the maintenance or the like, he or she sets the mode of the carriers to the operating mode, for example, by operating the first operation interface 4A. Thus, both the first and second carriers 101, 102 start to operate normally. At this time, the first openable/closable doors 31A to 33A and first drawing shelf 21A (the related openable/closable doors), which have not been monitored, are monitored. When one of the related openable/closable doors is opened, the first and second carriers 101, 102 stop operating due to an interlock.

As seen above, according to the present preferred embodiment, when the operator performs the maintenance or the like of one of the first and second carriers 101, 102, an article 400 held by the target carrier and/or an article 400 housed in a housing shelf 50 corresponding to the isolation region of the target carrier is carried to a housing shelf 50 on and from which the remaining carrier is able to transfer an article. Thus, it is possible to avoid the occurrence of an article 400 that cannot be carried and to improve the operating rate of the automated warehouse 1 while applying a partial interlock. While, in the above preferred embodiment, the first carrier 101 is isolated, similar control is performed even in a case in which the second carrier 102 is isolated. In this case, the second carrier 102 defines and functions as the particular carrier, and the first carrier 101 defines and functions as the remaining carrier.

While preferred embodiments have been described above, the present invention is not limited thereto. Changes can be made to the preferred embodiments without departing from the spirit and scope of the present invention. For example, while, in the preferred embodiments, two carriers preferably are used, three or more carriers may be used. In this case, one of the multiple carriers defines and functions as the particular carrier, and the other carriers define and function as the remaining carriers. In the preferred embodiments, the stoppers and/or cases preferably may be installed automatically, for example, on the basis of a signal from the controller 220.

While, in the preferred embodiments, the first and second carriers 101, 102 are carriers that travel along the rail installed on the floor, they may be ceiling traveling vehicles that travel along a rail installed on the ceiling, trackless traveling vehicles that do not require a rail or the like, or the like. Multiple automated warehouses 1 may be connected to a single track (a rail 6) and share multiple carriers. In this case, when one carrier enters another automated warehouse 1, carriers operating in the other automated warehouse 1 may be stopped.

While the preferred embodiments are preferably applied to the case in which the first or second carrier 101 or 102 is maintained, the preferred embodiments may also be applied to cases in which any type of apparatus, such as an $N_2$ purge system or a sorter included in the automated warehouse 1, is maintained. In this case, the first and second carriers 101, 102 retreat from the region in which the apparatus to be maintained is present and continue to operate in the regions except for this region. Thus, the maintenance operator is isolated from the first and second carriers 101, 102.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An automated warehouse comprising:
    an outside panel that defines an internal space and includes a plurality of openable/closable doors that are able to open the internal space;
    a plurality of carriers that each carry an article to a housing shelf in the internal space and travel on a single track; and
    a controller that controls the plurality of carriers; wherein
    if the controller receives an instruction to retreat one of the plurality of carriers holding an article or if an article is housed in a housing shelf corresponding to an isolation region that is a retreat destination, the controller causes the one of the plurality of carriers to carry the article to a housing shelf to and from which another of the plurality of carriers is able to transfer an article and then causes the one of the plurality of carriers to retreat;

after retreating the one of the plurality of carriers, the controller drives the another of the plurality of carriers within a range of the track except for the isolation region; and when it is detected that one of the plurality of openable/closable doors corresponding to the isolation region has been opened, the controller continues to drive the another of the plurality of carriers.

2. The automated warehouse of claim 1, wherein when it is detected that an unrelated one of the plurality of openable/closable doors not corresponding to the isolation region has been opened, the controller stops driving the another of the plurality of carriers.

3. The automated warehouse of claim 2, further comprising:
   a stopper detector that detects a stopper to regulate entry of the another of the plurality of carriers into the isolation region; and
   a cage detector that detects a cage surrounding a portion of the isolation region; wherein
   when the stopper detector detects the stopper and/or when the cage detector detects the cage, the controller starts to drive the another of the plurality of carriers and detects whether the unrelated one of the plurality of openable/closable doors has been opened.

4. The automated warehouse of claim 1, wherein
the isolation region is a region including an edge of the internal space; and
the controller moves the one of the plurality of carriers toward the edge of the internal space based on the retreat instruction.

5. A method for controlling an automated warehouse, the automated warehouse including an outside panel that defines an internal space and includes a plurality of openable/closable doors that are able to open the internal space and a plurality of carriers that each carry an article to a housing shelf in the internal space and travel on a single track, the method comprising:
   if an instruction to retreat one of the plurality of carriers holding an article is received or if an article is housed in a housing shelf corresponding to an isolation region that is a retreat destination, causing the one of the plurality of carriers to carry the article to a housing shelf to and from which another of the plurality of carriers is able to transfer an article and then causing the one of the plurality of carriers to retreat;
   after retreating the one of the plurality of carriers, driving the another of the plurality of carriers within a range of the track except for the isolation region; and
   when it is detected that one of the plurality of openable/closable doors corresponding to the isolation region has been opened, continuing to drive the another of the plurality of carriers.

6. The method for controlling the automated warehouse of claim 5, further comprising when it is detected that an unrelated one of the plurality of openable/closable doors not corresponding to the isolation region has been opened, stopping driving the another of the plurality of carriers.

* * * * *